United States Patent [19]

Chandler

[11] Patent Number: 4,779,254
[45] Date of Patent: Oct. 18, 1988

[54] READ HEAD ADJUSTING MOTOR ASSEMBLY

[75] Inventor: Jasper S. Chandler, Rochester, N.Y.

[73] Assignee: Eastman Kodak Company, Rochester, N.Y.

[21] Appl. No.: 944,126

[22] Filed: Dec. 22, 1986

[51] Int. Cl.$^4$ .............................................. G11B 7/095
[52] U.S. Cl. ..................................... 369/45; 369/112; 369/44
[58] Field of Search ...................... 369/44, 45, 46, 112; 250/201 DF; 350/6.3, 255

[56] References Cited

U.S. PATENT DOCUMENTS 4,479,051 10/1984 Musha .................................... 369/44
4,633,456 12/1986 Luecke ................................... 369/45

FOREIGN PATENT DOCUMENTS 0053476  6/1982 European Pat. Off. .............. 369/45
2132034  6/1984 United Kingdom .................. 369/45

Primary Examiner—Donald McElheny, Jr.
Attorney, Agent, or Firm—Warren W. Kurz

[57] ABSTRACT

A motor assembly incorporated in an optical read head to effect tracking or focusing movement of an optical element comprises a generally horseshoe-shaped field assembly having two slotted pole pieces magnetized with opposite polarity of a permanent magnet to provide two pairs of field poles confronting corresponding poles of a moveable armature. A single coil is wound through the slots of the pole pieces around the inner field poles. The direction and intensity of the current flowing in the field coil determines the degree to which the permanent magnetism is reinforced in one pole of each pole piece and counteracted in the other pole of each pole piece, thereby causing corresponding movement of the armature.

3 Claims, 1 Drawing Sheet

READ HEAD ADJUSTING MOTOR ASSEMBLY

BACKGROUND OF THE INVENTION

1. Field of the Invention

The invention relates to a read head assembly for optically reading information on a track of a record member and more particularly to a motor assembly for effecting tracking or focusing adjustment of an optical element of such an assembly.

2. Description of the Prior Art

With the exception of a few examples employing piezoelectric transducer elements or the like, the adjustment of the optical element of an optical read head assembly for tracking or focusing purposes is accomplished by one or more electromagnetic motors, which must be relatively powerful to effect the required rapid movement of the optical element while at the same time being relatively light and compact. To achieve these requirements, it has previously been proposed to employ the principal of providing permanently magnetized motor poles which are strengthened or counteracted by electromagnetic means, as shown, for example, in U.S. Pat. No. 4,479,051, issued on Oct. 23, 1984. Generally, however, such prior art devices have been relatively intricate and expensive for various reasons, including the use of complex or multiple electromagnet coils, the use of one or more moveable coils and the attendant need for flexible connecting wires, close tolerance requirements and structural design features that complicate coil winding or assembly.

SUMMARY OF THE INVENTION

To overcome these disadvantages, the present invention provides a simple but powerful and compact tracking or focusing motor assembly comprising a generally horseshoe-shaped field assembly having two slotted pole pieces magnetized with opposite polarity by a permanent magnet to provide two pairs of field poles confronting corresponding poles of a moveable armature. A coil within the slots is wound around the inner two field poles and the direction and intensity of the current flowing in the coil determines the degree to which the permanent magnetism of the inner pole of one of the pole pieces and the outer pole of the other pole piece is reinforced and the permanent magnetism of the other two poles of the field assembly is counteracted or neutralized. Accordingly, the armature can be moved selectively to any position within its intended range of movement by appropriate energization of the electromagnet coil.

BRIEF DESCRIPTION OF THE DRAWINGS

In the detailed description of the preferred embodiments of the invention presented below, reference is made to the accompanying drawings, in which.

DESCRIPTION OF THE ILLUSTRATIVE PREFERRED EMBODIMENTS

Figure 1:
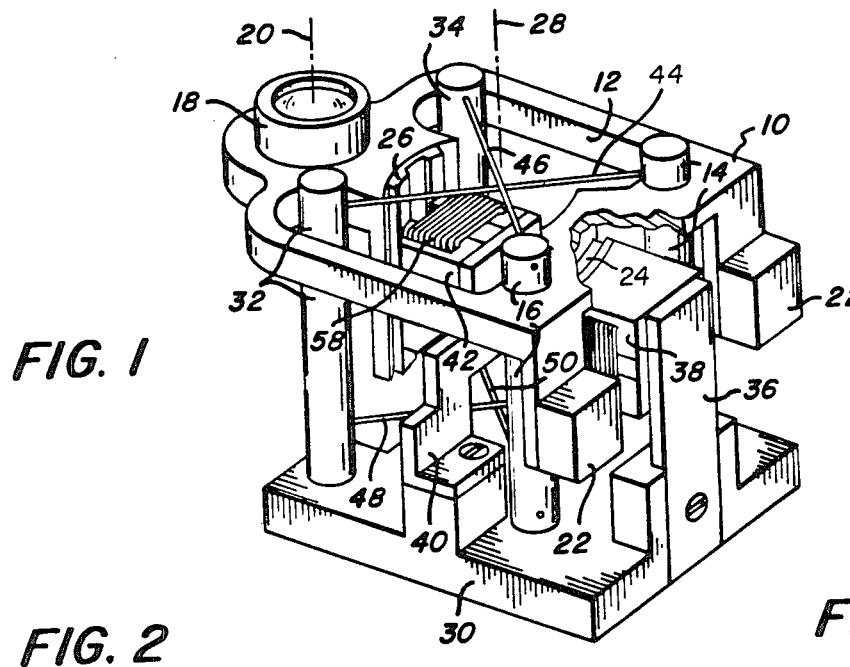
FIG. 1 is a perspective view of a flexure supported read head device employing two adjusting motors according to a preferred embodiment of the present invention.
Figure 2:
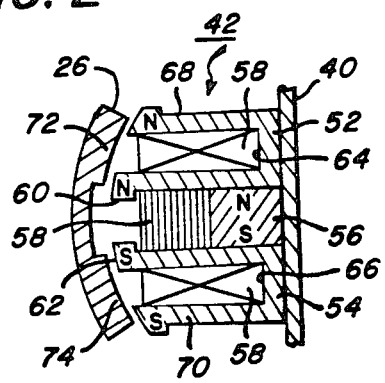
FIG. 2 is an enlarged top cross sectional view of the tracking motor incorporated in the device depicted in FIG. 1.
Figure 3:
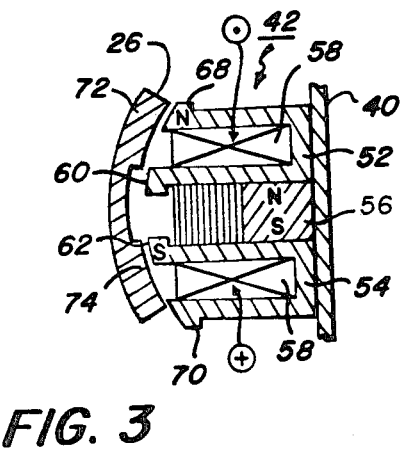
FIG. 3 corresponds to FIG. 2 but illustrates the condition of the motor when it is energized by current of a predetermined polarity.

The preferred embodiment of a read head device shown in FIGS. 1–3 of the accompanying drawings basically comprises an optical element assembly, a frame assembly, and the flexure structure by which the former is supported from the latter.

The optical element assembly comprises a rigid support member 10 provided with a central opening 12 and with a pair of depending support legs 14 and 16. The support member 10 is made of a strong, non-magnetic and relatively lightweight material, such as aluminum or fiber reinforced plastic. A lens assembly 18, defining an optical axis 20, is carried at one end of the support member and a pair of counterweight members 22 are carried at the opposite end thereof. Within the central opening 12, the support member also includes a pair of depending arcuate armature members 24 and 26, each of which is concentric with a vertical axis designated by numeral 28. The entire depicted device is generally symmetrical about a plane defined by the two axes 20 and 28.

The frame assembly is also made of a strong non-magnetic material, and comprises a base plate 30 provided with a pair of ascending support legs 32 and 34 that extend through opening 12 in member 10. A non-magnetic mounting arm 36, attached to the base plate 30, supports a focusing motor field assembly 38 adjacent the convex face of armature member 24, and a non-magnetic mounting bracket 40, attached to base plate 30, similarly supports a tracking motor field assembly 42 adjacent the concave face of armature member 26.

The four-bar flexure structure by which the optical element assembly is mounted to the frame assembly comprises four omnidirectionally flexible flexure bars in the form of identical substantially straight wires 44, 46, 48, 50, which are made of a strong and resilient material such as so-called "piano wire." Each wire is rigidly attached at one end to one of the legs 14 or 16 of the support member and to the diagonally opposite leg 32 or 34 of the frame assembly to provide upper and lower crossed wire flexures in parallel and mutually aligned relation to one another. The mutually aligned upper and lower wires 46 and 50 are respectively spaced slightly above and below the adjacent wires 44 and 48. As is well known in the flexure art, the line passing through the crossing points of the upper and lower sets of wires defines an effective pivot axis about which the optical element assembly can rotate through a small angle. This axis is coincident with the previously mentioned axis 28 of the armature members 24 and 26. Because the angle of rotation is relatively small, the flexure structure provides the functional equivalent of a mechanical pivot but with the advantage of being free of friction and slip-stick hysteresis and by being self-biasing toward a neutral position. The parallelism between the upper and lower pairs of crossed wires provides the equivalent of another well known type of flexure in which two parallel cantilevered flat springs support a member for movement in the direction of flexure of the springs while maintaining it parallel to its original position. Accordingly, the optical element can move resiliently upwardly or downwardly to focus the lens but the latter cannot tilt.

By balancing the optical element assembly so that its center of mass is coincident with its rotational axis, inertial forces arising from lateral positioning movements of the entire read head assembly are prevented from inducing any rotational or tracking movement of the optical element assembly relative to the frame member.

As is most clearly shown in FIGS. 2 and 3, the field assembly 42 of the tracking motor is generally horseshoe shaped and comprises a pair of slotted pole pieces 52 and 54 made of a magnetically permeable material, e.g., soft iron or sintered ferritic material, the pole pieces 52 and 54 are located symmetrically in contact with the respective north and south poles of a strong rectangular permanent magnet 56 and are maintained in position by being bonded or otherwise rigidly attached to the magnet and/or the mounting bracket 40. Alternatively, the file assembly comprising the two pole pieces and the permanent magnet might be formed as a unitary one-piece structure. A rectangular coil 58 comprises many turns of insulated wire wrapped around the inner field poles 60 and 62 of pole pieces 52 and 54 and substantially filling the corresponding pole piece slots 64 and 66.

When no current is flowing in coil 58, magnet 56 causes both the outer field pole 68 and the inner field pole 60 of pole piece 52 to exhibit north magnetic polarity and both the outer field pole 70 and the inner field pole 62 of pole piece 54 to exhibit south magnetic polarity. Consequently, as depicted in FIG. 2, the armature is magnetically attracted to its central position in which the vertically disposed armature poles 72 and 74 are respectively centered in relation to the two poles of the adjacent pole pieces 52 and 54; thus maximizing the density of the magnetic flux in the gaps between the armature pole and the corresponding pole pieces.

When current flows in coil 58 in a counterclockwise direction as viewed from the bracketed end of the tracking motor, i.e., when the direction of the current flow with respect to FIG. 3 is "into the paper" ($\oplus$) in pole piece 54 and "out of the paper" (⊙) in pole piece 52, the resulting electromagnetic field reinforces or intensifies north polarity of field pole 68 and the south polarity of field pole 62, both produced by magnet 56, and counteracts the similarly produced north polarity of field pole 60 and south polarity of field pole 70; thereby causing the armature to be displaced in a clockwise direction as shown in FIG. 3. Similarly, when the current in the coil flows in the opposite direction, the armature will likewise be magnetically displaced in the opposite direction.

If the current flow shown in FIG. 3 were sufficient to essentially neutralize the polarity of field poles 60 and 70, the armature would move to a position at which armature poles 72 and 74 would be substantially aligned with the centers of the respective north and south field poles 68 and 62. In practice, however, the current flow is preferably limited such that the maximum armature movement, in both directions, is always somewhat less than half the width of the field poles, as shown in FIG. 3. In this range of movement, the armature displacement is substantially linear with respect to the current flow, whereas, significant non-linearity may occur if a greater range of movement is employed. Because the focusing movement of support member 10 moves armature 26 vertically relative to pole pieces 52 and 54, the armature poles 72 and 74 extend sufficiently above and below the pole pieces to be in confronting relation thereto regardless of the focusing condition of the read head device.

Figure 4:
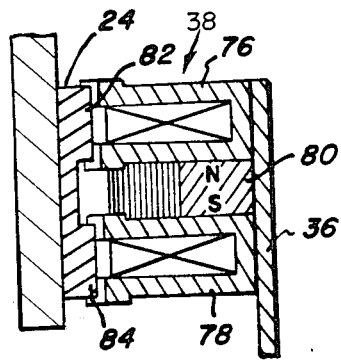
FIG. 4 is an enlarged frontal cross-sectional view of the focus motor incorporated in the device depicted in FIG. 1.

The focusing motor 38, shown in FIG. 4, is basically similar to the previously described tracking motor 42, comprising a pair of pole pieces 76 and 78 supported by mounting arm 36 in contact with adjacent faces of a permanent magnet 80 and spaced from respective horizontal armature poles 82 and 84 of armature member 24. In this case, however, because the motor causes its armature to move vertically along a substantially straight line, the curvature of the confronting armature and field pole faces accommodates the movement induced by the tracking motor 42 rather than that induced by the focusing motor 38.

Figure 5:
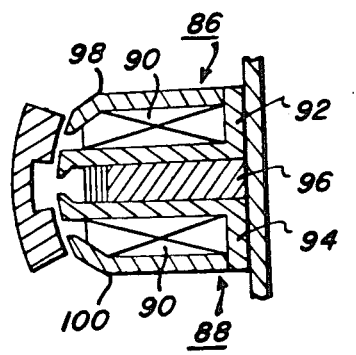
FIG. 5 is a cross-sectional view of a more compact version of a motor similar to those shown in the preceeding figures.

It should be understood that the motors illustrated in FIGS. 2, 3 and 4 are illustrative only and that more compact motors with different movement ranges can be designed. For example, FIG. 5 illustrates a modification of the focusing motor shown in FIG. 2, in which the pole pieces 86 and 88 are each made in two pieces to permit the coil 90 to be wound after the inner pole piece members 92 and 94 have been attached to the permanent magnet 96, but before the respective outer pole piece members 98 and 100 are bonded or otherwise fastened in place; thereby reducing the overall size of the motor assembly by allowing the field poles to be located in closer proximity to each other, without reducing the effective size of the electromagnetic coil. Regardless of such specific design features, however, a tracking or focusing motor of the basic configuration described above has the advantage of being simple, compact, relatively inexpensive, powerful, easily assembled, and reliable. Of particular significance is the fact that, in such a motor, the coil is immovable, which prevents it from contributing to the movable mass of the motor and also eliminates the need for fragile flexible connecting wires. Furthermore, the arrangement of the coil inherently provides good heat dissipation. Additionally, because the net magnetic attractive force tending to pull the armature into contact with the pole pieces is substantially constant, different modes or levels of motor energization do not significantly influence the resonance characteristics of this device. In the latter regard, is should also be noted that in the illustrative embodiments both motors attract their respective armatures in the same direction, i.e., in the direction in which the flexure bars are under tension rather than compression, thus increasing the natural resonant frequency of the device and absorbing the attractive force in the direction in which the device is most resistant to deformation. However, alternative motor arrangments can be employed to achieve greater compactness or power. For example, a pair of oppositely facing tracking motors might be combined with a pair of oppositely facing focusing motors located at right angles to the tracking motors to effectively double the available motor power while balancing the attractive forces tending to pull the armatures toward the respective pole pieces. Alternatively, it is also possible to achieve greater compactness and weight reduction by allowing a single permanent magnet to magnetize the pole pieces of more than one motor assembly.

The electrical circuitry employed to energize the tracking and focusing motors has not been specifically disclosed or described, but many examples of such circuitry are well known in the prior art. In addition to its basic functions of maintaining the lens in proper focus and in its proper tracking position, such circuitry can also serve to dampen resonant vibrations, to compensate for off-axis optical phenomena and to lock the tracking position of the lens during rapid positioning movement of the read head assembly.

Although the invention has been described with particular reference to presently preferred embodiments thereof, it will be understood that variations and modifications can be effected within the spirit and scope of the invention as described above and as defined in the appended claims.

I claim:

1. An adjusting motor assembly for use in an optical read head device including a support member supporting a movable member that carries an optical element, said motor assembly comprising:
   a generally horse-shoe shaped field assembly mounted to said support member and comprising two slotted pole pieces defining two pairs of field poles;
   permanent magnet means for magnetizing said pole pieces with opposite polarity;
   an electromagnet coil rigidly coupled to and encircling the two inner poles of said field assembly; and
   an armature mounted to said movable member, said armature including means defining two armature poles respectively confronting said two pairs of field poles of said field assembly in spaced relation thereto;
   whereby, said armature and thereby said movable member is magnetically movable by said motor assembly in accordance with the direction and intensity of the current flowing through said coil.

2. The invention defined by claim 1 in which said movable member is rotatable relative to said support member and in which the confronting spaced surfaces of said armature poles and said pole pieces of said field assembly are concentric with the axis of rotation of said movable member.

3. The invention defined by claim 1 in which each of said pole pieces is a two part structure comprising an inner pole member and an outer pole member.

* * * * *